W. H. LEE.
MANURE SPREADER.
APPLICATION FILED JAN. 23, 1915.

1,242,705.

Patented Oct. 9, 1917.
2 SHEETS—SHEET 1.

WITNESSES:

INVENTOR
William H. Lee,
BY
ATTORNEYS

W. H. LEE.
MANURE SPREADER.
APPLICATION FILED JAN. 23, 1915.
1,242,705.
Patented Oct. 9, 1917.
2 SHEETS—SHEET 2.
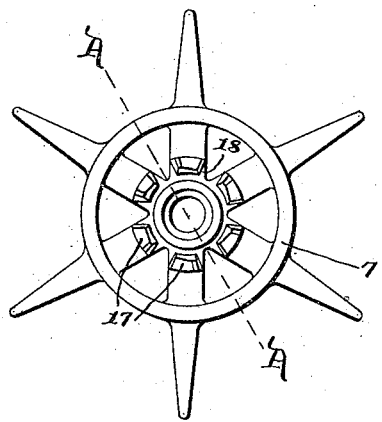
Fig-3-
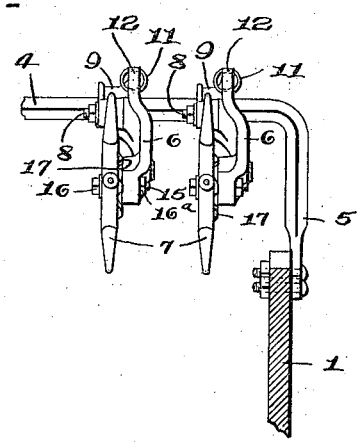
Fig-2-
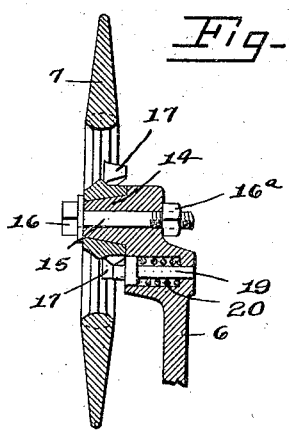
Fig-4-
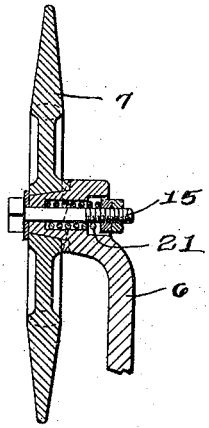
Fig-6-
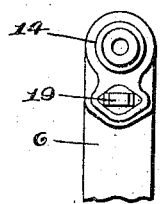
Fig-5-
WITNESSES:
INVENTOR
William H. Lee
BY
ATTORNEYS

UNITED STATES PATENT OFFICE.

WILLIAM H. LEE, OF SYRACUSE, NEW YORK, ASSIGNOR TO SYRACUSE CHILLED PLOW COMPANY, OF SYRACUSE, NEW YORK, A CORPORATION OF NEW YORK.

MANURE-SPREADER.

1,242,705.   Specification of Letters Patent.   Patented Oct. 9, 1917.

Application filed January 23, 1915. Serial No. 4,043.

*To all whom it may concern:*

Be it known that I, WILLIAM H. LEE, a citizen of the United States, and a resident of Syracuse, in the county of Onondaga and State of New York, have invented a certain new and useful Manure-Spreader, of which the following is a specification.

This invention relates to manure spreaders and has for its object a particularly simple and efficient means for holding the load and guiding it to the beater; and it consists in the combinations and constructions hereinafter set forth and claimed.

In describing this invention, reference is had to the accompanying drawings, in which like characters designate corresponding parts in all the views.

Fig. 2 is a fragmentary view in front elevation of a portion of the rake and contiguous parts.

Fig. 3 is an enlarged side elevation of one of the wheels of the rake.

Fig. 4 is a section taken on the plane of line A—A, Fig. 3, the contiguous portions of the support for the wheel being also shown.

Fig. 5 is an elevation of the bracket or bearing upon which each wheel is mounted.

Fig. 6 is a view similar to Fig. 4, of a modified form of parts seen in Fig. 4.

Figure 1:
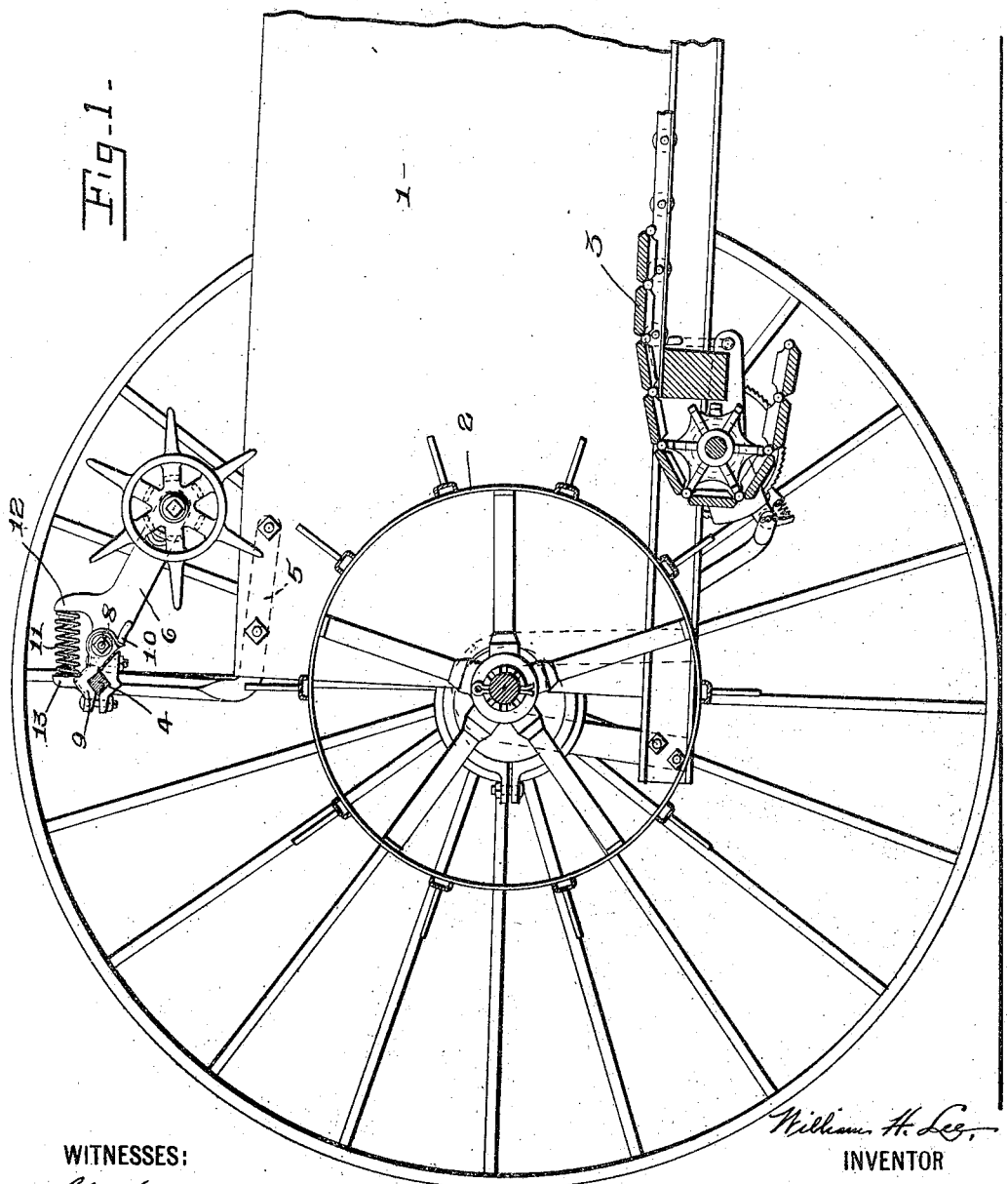
Figure 1 is a fragmentary longitudinal sectional view of the rear end of one form of manure spreader embodying my invention.

1 designates the body or box of the manure spreader, 2 the rotatable beater, and 3 the movable bottom or apron for feeding the load toward the beater. The beater is mounted at the rear end of the body 1 and is actuated in any well known manner. The bottom or apron 3 may be of any desirable form, size and construction, and as the construction of the beater and bottom is well known, further description is thought to be unnecessary.

The means for holding the load and guiding it to the beater is for convenience called a rake, and it consists generally of a plurality of toothed members arranged in a series crosswise of the box near the beater and mounted to yield independently of each other, and means for yieldingly locking the toothed members from movement about their axes and positioning them so that their points or teeth are always arranged in a predetermined relation to the beater as substantially radially with the axis of the beater, the locking means permitting movement of the toothed members when subjected to sufficient force to overcome the locking action.

As here shown, the rake construction includes a crossbar 4 mounted on the rear end of the body and supported at its ends by brackets 5 rising from the opposite sides of the body 1, rock arms 6 supported by the bar 4, and members movable about axes as toothed wheels 7 carried at the free ends of said arms 6. The brackets 5 are here shown as formed integral with the crossbar 4; and the rock arms 6 are here shown as pivoted at 8 to brackets 9 clamped on the crossbar in any suitable manner. The rock arms 6 preferably extend downwardly and forwardly from their pivots and carry the wheels 7 at their front ends, the arrangement of the crossbar and the rock arms being such that the toothed wheels are arranged above the beater and in front of the vertical plane of the axis of the beater. Downward pivotal movement of the rock arms 6 from their normal positions is prevented by stops 10, and upward pivotal movement of the rock arms is resisted by springs 11, individual to the rock arms. The springs 11 are here shown as interposed between shoulders 12, 13 provided respectively on the rock arms 6 in front and above the pivots 8 and on the brackets 9 in the rear of said pivots.

Each wheel 7 is here shown as mounted upon a bearing 14 at the free end of its supporting rock arm 6, as seen in Fig. 4, and is held in position in any suitable manner, as by bolt 15 extending axially through the bearing and having a head 16 at one end large enough to engage the hub of the wheel 7 and a nut 16ᵃ at its other end turning against the arm 6.

The means for yieldingly locking the wheels 7 from rotation and holding them in a predetermined relation to the beater comprises sets of ratchet teeth provided on the wheels 7 and on the arms 6, one set of ratchet teeth being spring pressed. These ratchet teeth may be provided in any suitable manner, and preferably each wheel is provided with a series of ratchet teeth 17 on a side face thereof concentric with the axis thereof and with spaces 18 between the ratchet teeth, and each arm 6 is provided with a single spring pressed ratchet tooth, or pawl 19 arranged to yield in the direction of the axis of the wheels. The ratchet tooth or pawl 19 is here shown as a plunger movable in a socket arranged eccentric to the axis of the companion wheels 7 and pressed outwardly to engage the teeth 17 by a spring 20. The spaces 18 between the teeth are formed with open bottoms in order to avoid the accumulation of dirt between the teeth so that the yielding locking means will always work to best advantage. These spaces are so arranged that when the pawl tooth 19 is in one of them, one of the points of the wheel is in a predetermined relation to the beater as radial to the axis of the beater, and other teeth are positioned to extend into the load. The ratchet teeth 17 and pawl 18 prevent retrograde movement of the wheel 7.

As seen in Fig. 6, however, the yielding locking means for each wheel may consist of clutch teeth provided on the side face of the wheel 7 and on the bracket or arm 6, both sets of teeth being arranged concentric with the axis of the wheel, and the wheel being movable axially of its bearing during the ratcheting operation, against the action of a spring 21 encircling the pin 15 and acting to force said pin to carry the wheel to the right to engage the clutch teeth.

In operation, the manure is loaded in the box to or slightly above the level of the axis of the wheels 7, or is piled against the wheel 7 during the feeding of the apron, and is held from being pushed in large quantities over the beater, and is guided to the beater by the wheels 7, some of the teeth of which extend into the load and restrain it and others of which extend toward the beater and regulate the distribution of the load by the beater. During the greater part of the feeding operation some large lumps or clods are being constantly thrown back on to the apron, and hence at the end of the load these lumps or clods are quite numerous and as the apron feeds these lumps or clods to the beater if too solid to be broken, the wheel or wheels 7 with which they contact will rotate after a certain amount of pressure is applied thereto determined by the tension of the springs 20 and the angle or incline of the ratchet teeth. In case of an extra large lump, the supporting arm or arms 6 of said wheel or wheels will yield upwardly to release the lump. Hence, one or more wheels can yield independently of the other and relieve the pressure of the load only at the point it is abnormal, and when said wheels do yield teeth thereof are moving into position to take into the load. Of course, the rake acts as described not only on the last portion of the load, but during the entire distribution of the load.

What I claim is:—

1. In a manure spreader, a body, a beater, means for feeding the load to the beater, and a rake arranged above and in front of the vertical plane of the axis of the beater, the rake including a toothed member movable about an axis, and means for yieldingly locking said member from movement about its axis and positioning the same in predetermined relation to the beater, said locking means permitting movement of the toothed member when subjected to sufficient force to overcome the locking action, substantially as and for the purpose described.

2. In a manure spreader, a body, a beater, means for feeding the load to the beater, and a rake arranged crosswise of the body and including a series of toothed wheels arranged above the beater and in front of the vertical plane of the axis of the beater, the wheels being rotatable independently of each other, and means for yieldingly locking the wheels from rotation and stopping the same with points thereof extending substantially toward the beater in a line extending radially with the axis of said beater, the locking means permitting movement of the toothed member when subjected to sufficient force to overcome the locking action, substantially as and for the purpose specified.

3. In a manure spreader, a body, a beater, means for feeding the load to the beater, and a rake including a bar extending crosswise of the body above the beater, rock arms pivotally supported at their rear ends on the bar and extending forwardly and downwardly from their pivots, toothed wheels carried by the rock arms, and means for yieldingly locking the wheels from rotation and stopping the rotation thereof with points thereof extending in lines substantially radial with the axis of the beater, said locking means permitting movement of the toothed member when subjected to sufficient force to overcome the locking action, substantially as and for the purpose set forth.

4. In a manure spreader, a body, a beater, means for feeding the load to the beater, and a rake including a bar extending crosswise of the body above the beater, rock arms pivotally supported at their rear ends on the bar and extending forwardly and downwardly from the pivots, toothed wheels carried by the rock arms, and means for yieldingly locking the wheels from rotation and stopping the rotation thereof with points thereof extending in lines substantially radial with the axis of the beater, said locking means permitting movement of the toothed members when subjected to sufficient force to overcome the locking action, the rock arms being movable upwardly on their pivots, and springs for resisting the yielding movement, substantially as and for the purpose described.

5. In a manure spreader, a body, a beater, means for feeding the load to the beater, and a rake arranged near the beater crosswise of the body and including toothed members arranged in a series extending across the body said members being movable step by step in one direction independently of each other, and means for preventing retrograde movement of the toothed members, substantially as and for the purpose specified.

6. In a manure spreader, a body, a beater, means for feeding the load to the beater, and a rake arranged near the beater crosswise of the body and including toothed members arranged in a series extending across the body, said members being movable step by step in one direction independently of each other, and means for yieldingly locking each toothed member from movement about its axis, said locking means permitting such movement of each toothed member when subjected to sufficient force to overcome the locking action, substantially as and for the purpose set forth.

7. In a manure spreader, a body, a beater, means for feeding the load to the beater, and a rake arranged near the beater and crosswise of the body and including a series of toothed wheels rotatable independently of each other, substantially as and for the purpose described.

8. In a manure spreader, a body, a beater, means for feeding the load to the beater, and a rake arranged near the beater and crosswise of the body and including a series of toothed wheels rotatable independently of each other, and means for yieldingly locking each toothed wheel from movement about its axis, said locking means permitting such movement of each toothed wheel when subjected to sufficient force to overcome the locking action, substantially as and for the purpose specified.

9. In a manure spreader, a body, a beater, means for feeding the load to the beater, and a rake arranged near the beater crosswise of the body and including toothed members arranged in a series extending across the body, said members being movable step by step independently of each other, and spring pressed means for yieldingly locking each toothed member from movement and stopping the movement thereof with points thereof extending toward the beater in a line substantially radial with axis of the beater, said locking means permitting such movement of each toothed member when subjected to sufficient force to overcome the tension of the spring, substantially as and for the purpose set forth.

10. In a manure spreader, a body, a beater, means for feeding the load to the beater, and a rake arranged near the beater and crosswise of the body and including a series of toothed wheels movable independently of each other, and spring pressed means for yieldingly locking each toothed wheel from rotation, said locking means permitting such movement of each toothed wheel when subjected to sufficient force to overcome the locking action, substantially as and for the purpose described.

11. In a manure spreader, a body, a beater, means for feeding the load to the beater, and a rake including supporting means near the beater and extending crosswise of the body, a series of toothed members carried by the supporting means, and movable about axes independently of each other, and means for yieldingly locking each toothed member from movement about its axis, said means comprising ratchet teeth provided on the toothed members and on the support, one set of teeth being yieldable, substantially as and for the purpose specified.

12. In a manure spreader, a body, a beater, means for feeding the load to the beater, and a rake including supporting means arranged near the beater and extending crosswise of the body, a series of toothed members carried by the supporting means and movable about axes independently of each other, and means for yieldingly locking each toothed member from movement about its axis, the locking means comprising sets of ratchet teeth provided respectively on the toothed members and on the supporting means, one set of teeth being yieldable in the direction of the axes of the toothed members, substantially as and for the purpose set forth.

13. In a manure spreader, a body, a beater, means for feeding the load to the beater, a rake including means arranged near the beater and extending crosswise of the body, a series of toothed members carried by the supporting means and movable about axes independently of each other, and means for yieldingly locking each toothed member from movement about its axis, said means comprising sets of ratchet teeth provided on the toothed members and on the supporting means, one set of teeth including a number of series of ratchet teeth, arranged concentric with said axes, one series for each member and the other set comprising individual teeth one for each of said series of teeth and being yieldable in the direction of the axes of the toothed members and the spaces between the ratchet teeth of the series having open bottoms, substantially as and for the purpose described.

14. In a manure spreader, a body, a beater, means for feeding the load to the beater, and a rake including supporting means extending crosswise of the body near the beater, a series of rotatable toothed wheels carried by the supporting means, each having a series of ratchet teeth on a side face thereof, the spaces between the teeth being formed with open bottoms, and a spring pressed yielding tooth for each wheel carried by the supporting means and coacting with the teeth of the wheels, substantially as and for the purpose specified.

15. In a manure spreader, a body, a beater, means for feeding the load to the beater, a rake including a bar extending crosswise of the body above, and in front of, the beater, independently movable rock arms pivotally supported on the bar and independently movable toothed members carried at the front ends of the rock arms, one toothed member being carried by each arm, substantially as and for the purpose set forth.

In testimony whereof, I have hereunto signed my name, in the presence of two attesting witnesses, at Syracuse, in the county of Onondaga, in the State of New York, this 4th day of January, 1915.

WILLIAM H. LEE.

Witnesses:
A. R. BARNES,
CHAS. H. YOUNG.

Copies of this patent may be obtained for five cents each, by addressing the "Commissioner of Patents, Washington, D. C."